United States Patent [19]
Ohmori

[11] 3,911,454
[45] Oct. 7, 1975

[54] QUICK RETURN MIRROR DEVICE IN A SINGLE LENS REFLEX CAMERA

[75] Inventor: Sachio Ohmori, Yokohama, Japan

[73] Assignee: Nippon Kogaku K.K., Tokyo, Japan

[22] Filed: Sept. 13, 1973

[21] Appl. No.: 396,736

[30] Foreign Application Priority Data
Sept. 22, 1972 Japan.............................. 47-94638

[52] U.S. Cl................................ 354/154; 354/152
[51] Int. Cl.².......................................... G03B 19/12
[58] Field of Search............. 95/42 R; 354/152, 154, 354/155, 156

[56] References Cited
UNITED STATES PATENTS

| | | | |
|---|---|---|---|
| 1,484,584 | 2/1924 | Tavern................................ | 354/154 |
| 3,757,661 | 9/1973 | Ochiai et al. ........................... | 95/42 |

*Primary Examiner*—Monroe H. Hayes
*Assistant Examiner*—Alan Mathews
*Attorney, Agent, or Firm*—Fitzpatrick, Cella, Harper & Scinto

[57] ABSTRACT

A quick return mirror device in a single lens reflex camera which is able to maintain a finder image in a stationary state even during operation of a mirror for withdrawal and restoration to increase substantial viewing time and to reduce shock and dynamic unbalance. A mirror is disposed substantially at an angle of 45° in the path of the light beam and is mounted to perform a reciprocating motion in parallel to the film surface, and the angle of the mirror can be maintained even when the mirror is withdrawn out of the path of the light beam or when it is returned thereinto. A rotational motion is converted into a rocking motion to cause the mirror and a douser or shield plate to reciprocate. Parallel reciprocating motion of the mirror and douser are simultaneously initiated from each other in the opposite direction.

4 Claims, 4 Drawing Figures

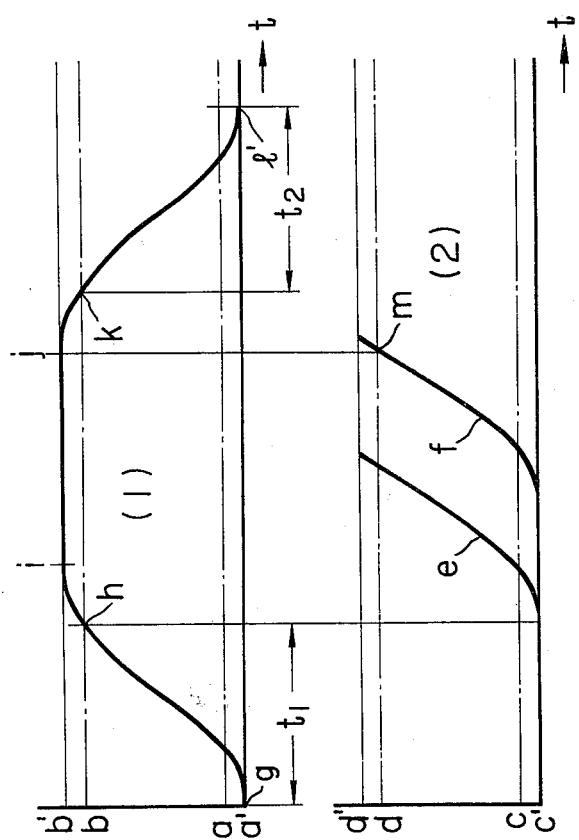

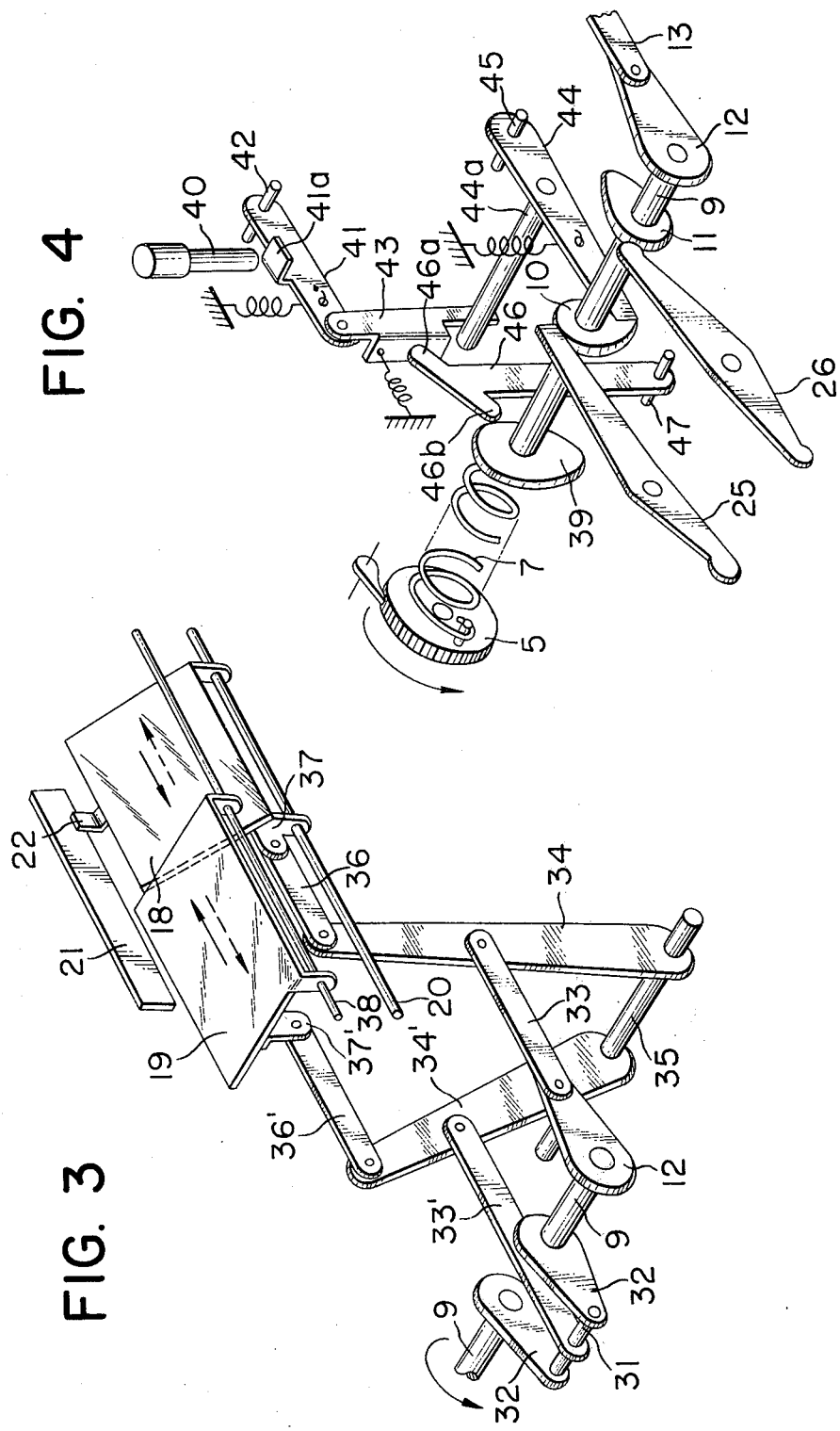

QUICK RETURN MIRROR DEVICE IN A SINGLE LENS REFLEX CAMERA

BACKGROUND OF THE INVENTION

1. Field of the Invention

The present invention relates to quick return mirror devices in single lens reflex cameras.

2. Description of the Prior Art

In such prior art mirror devices, immediately before the shutter is released, a mirror disposed substantially at an angle of 45° to an image plane is withdrawn from the path of the light beam by rotational motion or by a combination of rotational and translational motion. In such constructions however, it was found that as the withdrawing motion of the mirror commences, the angle of the mirror varies, and a finder image also begins to move. The same is true when the mirror performs its restoring motion into the path of the light beam. Consequently, the finder image coincides with the image plane only when the mirror is stationary at said angle.

On the other hand, with the recent advances of motor drive devices, the speed of continuous photographing has increased, and it has been recognized that there is a need to shorten the disappearance time of the finder image because of the requirements of finder viewing during continuous photographing.

SUMMARY OF THE INVENTION

I have conceived a quick return mirror operating device for a single lens reflex camera whereby I am able to maintain a finder image in a stationary state even during operations of withdrawal and restoration of the mirror so as to place the finder in a viewing condition, thus substantially increasing the viewing time, that is, shortening the finder image disappearance time, thus to meet the requirements as described above.

My contribution also provides a simple device which generates a minimal amount of shock, camera vibration and noise by reducing the shock and dynamic unbalance possibly occurring when the mirror is withdrawn or restored.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

BRIEF DESCRIPTION OF THE DRAWINGS

Specific embodiments of the invention have been chosen for purposes of illustration and description, and are shown in the accompanying drawings, forming a part of the specification wherein:

FIG. 2 is a curve depicting the motion of a mirror and a shutter according to the present concept;

FIG. 3 is a perspective view illustrating another embodiment of a mirror drive device; and FIG. 4 is a perspective view illustrating an embodiment in which the mirror is caused to begin its motion directly by a shutter release button.

DESCRIPTION OF THE PREFERRED EMBODIMENTS

Figure 1:
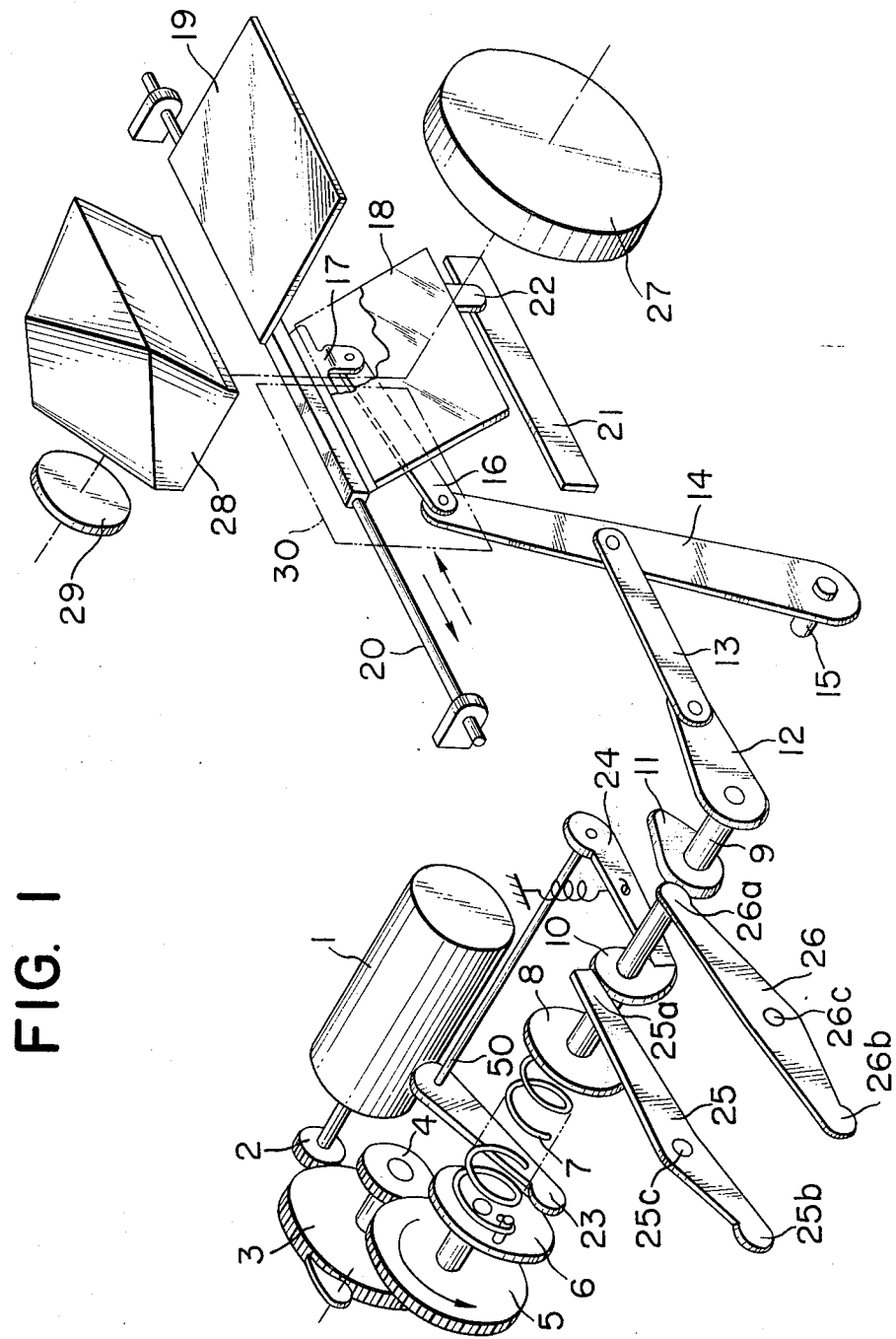
FIG. 1 is a perspective view illustrating features of one embodiment according to the invention.

Referring now to FIG. 1, I provide a prime mover 1, gears 2, 3, 4 and 5, and a cam 6 disposed in coaxial relationship with the gear 5 and adapted to generate a start signal for mirror movement, the cam having a drive spring 7 secured at one end thereof. A driving shaft 9 has secured to it a drive spring engaging member 8 at one end and a stop pawl cam 10, a cam 11 adapted to transmit a signal to the shutter, and a rotating lever 12. Mounted for pivotal movement on another shaft 15 is a lever 14 and this lever is coupled to the rotating lever 12 by a connecting lever 13 connected at one end to the middle of lever 14. The end of the lever 14 opposite the shaft 15 is coupled with a lever receiver 17 through an intermediate lever 16, and the lever receiver 17 is secured to a mirror 18. Pins, which serve to connect lever 12 with lever 13, lever 13 with lever 14, lever 14 with lever 16, and lever 16 with lever receiver 17, are loosely fitted. Thus, a link mechanism is formed by these levers 12, 13, 14 and 16. The lever receiver 17 is also loosely fitted to a sliding shaft 20, on which is fixed a shield plate 19. An angle positioning lever 22 secured to the mirror 18 is slidable along an angle positioning plate 21 and is pressed against the angle positioning plate 21 by means of a spring or the like (not shown) so as to maintain the mirror 18 at a constant angle at all times. A lever 23 bears against the cam surface of cam 6 and, upon rotation of the cam, transmits a signal to commence motion. A stop pawl 24 is provided at one end of a shaft 50 which is also connected to lever 23 so that pawl 24 moves coaxially with that lever out of engagement with stop pawl 10.

A lever 25 is arranged to pivot about an axis 25c and is contoured at one end to engage pawl 10 to stop driving shaft 9 in half-rotated position, and has at the other end a slide face 25b which receives a signal from a rear screen of a shutter mechanism (not shown). A further lever 26 is arranged to pivot about axis 26c and has at one end a slide face 26a which receives a signal from cam 11, and has at the other end a slide face 26b which causes the shutter mechanism to commence its motion upon receipt of said signal.

There are also shown a photographing lens 27, a pentagonal prism 28, an ocular 29, and an exposure window 30.

Referring now to FIG. 2, (1) and (2) are a mirror motion curve and a shutter motion curve, respectively, in which $a' - b'$ and $c' - d'$ indicate the distance of the respective motions, $a - b$ and $c - d$ indicate the range of the exposure window, and the axis of abscissa indicates time $t$. The mirror moves in the order of $g - h - i$ intercepting the path of the light beam, and again moves in the order of $j - k - l$ restoring to its original state. Motion of a front screen is indicated by $e$, and motion of a rear screen by $f$.

FIG. 3 shows another embodiment of the mirror motion, in which the driving shaft 9 forms a crank shaft together with rotating levers 12 and 32, and a shaft 31. Loosely fitted onto a shaft 35 are rocking levers 34 and 34', to which, in their middle zones, connecting levers 33 and 33' are coupled and with which connecting levers 36 and 36', connected at one end with lever receivers 37 and 37', are respectively coupled at the other ends thereof. The lever receiver 37 secured to the mirror 18 is loosely fitted on a sliding shaft 20 and a shield plate 19 is secured at one end to the lever receiver 37' and is fitted on a sliding shaft 38. There are also shown an angle positioning plate 21 and an angle positioning lever at 22 bearing against same and is secured to the mirror 18.

FIG. 4 shows a mechanism for a conventional still camera, illustrating one embodiment of the type in which a stop pawl is moved by a shutter release button. Thus, there is shown a gear 5 to which the end of a drive spring 7 is secured. A driving shaft 9 is provided at one end with a cam 39 having a drive spring engaging member, a stop pawl cam 10, a cam 11 which transmits a signal to a shutter, and a rotating lever 12. There are also shown a release button at 40, a lever 41, into which a shaft 42 is fitted, and having a tab 41a. The lever 41 is further coupled with a lever 43 at one end thereof. A stop pawl 44 is provided into which a shaft 45 is fitted, the pawl 44 having a pin 44a. A lever 46 into which a shaft 47 is fitted has slide faces 46a and 46b, and levers 13, 25 and 26 are also provided which function in the same manner as described in conjunction with FIG. 1.

The above described device will be operated in the following manner.

According to the construction of FIG. 1, when a switch for the prime mover 1 is energized by operation of a release button (not shown), the prime mover starts to run, the rotation thereof being transmitted to the gear 5 through a reduction gear, and the gear 5 rotates in the direction as indicated by the arrow. Rotation of cam 6 coaxial with said gear 5 causes the lever 23 to move, the stop pawl 24, coaxial with said lever 23, is disengaged from the stop pawl cam 10, and the driving shaft 9 starts to rotate under a spring force derived from the energy accumulated in the drive spring 7 in the same direction as that of the gear 5. When the driving shaft 9 is rotated, the mirror 18 and the shield plate 19 initiate their parallel motion in the direction as indicated by the full line arrow. When the mirror reaches a position indicated at $h$ in FIG. 2, the lever 26 is moved by the cam 11 and the front screen of the shutter starts its motion. On the other hand, when the driving shaft 9 is half-rotated, the stop pawl 25a of the lever 25 is brought into engagement with the stop pawl cam 10 to stop rotation of the driving shaft 9, and the mirror is also stopped. In this case, the mirror is in a position entirely withdrawn from the exposure window 30, and the shield plate 19 is in a position which entirely intercepts the focusing plate. When the exposure is completed and the rear screen of the shutter is brought to a position shown at $m$ in FIG. 2, the lever 25 is moved by a signal from the rear screen of the shutter, the stop pawl 25a is disengaged from the stop pawl cam 10, and the driving shaft 9 again starts to rotate in the same direction as the rotating direction of the gear 5. At this time, the mirror 18 and the shield plate 19 initiate their parallel motion in the direction as indicated by the broken line arrow by action of the rotating lever 12 and the rocking lever 14. When the driving shaft 9 is further half-rotated, it returns to its original position, and the stop pawl cam 10 is again stopped by the stop pawl 24 to stop rotating the driving shaft 9. At this time, the mirror 18 and shield plate 19 are restored to their original position. If the prime mover 1 continues its rotation successive photographing can be continuously effected, while if the prime mover 1 is stopped, photographing of one frame only can be made. Even when one frame photographing is taking place, the driving shaft 9 as well as the gear 5 is rotated once, so that the drive spring 7 accumulates energy for the next photographing action. Further, the prime mover can be also rotated simultaneously while being coupled with a force accumulating shaft in the shutter mechanism and a film feeding reel shaft in a known manner.

In FIG. 3, the driving shaft 9 moves in a manner similar to that shown in FIG. 1, but in the crank mechanism the rotating lever 12 is displaced by 180° from lever 32, and therefore the mirror 18 and the shield plate 19 simultaneously move in opposite directions. That is, when the driving shaft 9 is first half-rotated, the mirror 18 and shield plate 19 move in the direction of the full line arrow, and when the other half rotation thereof is made, they move in the direction of the broken line arrow, thus returning to their original positions.

In FIG. 4, the gear 5 is pre-rotated for one revolution in the direction as indicated by the arrow to accumulate energy in the drive spring 7. Thereafter, when the release button 40 is depressed, the tab 41a of the lever 41 is pushed to rotate the lever 41. At this time, the lever 43, coupled with the end of the lever 41, moves downwardly to push the pin 44a of the stop pawl 44 by a stepped portion of the lever 48 so that the stop pawl 44 is disengaged from the stop pawl cam 10, and the driving shaft 9 starts to rotate by means of the force of the drive spring 7 in the same direction as the rotating direction of the gear 5. When the driving shaft 9 is rotated, the lever 46 is pushed by a cam 39 and further the tab of the lever 43 is pushed by a lever 46 so that the stepped portion of the lever 43 is disengaged from the pin 44a of the stop pawl 44. As a result, the stop pawl 44 is returned to its original position and therefore when the driving shaft 9 is rotated for one revolution the stop pawl cam 10 is brought into engagement with the stop pawl 44 to stop rotation of the driving shaft 9. The mirror and shield plate are similarly moved as in those cases described in conjunction with FIGS. 1 and 3, and the levers 25 and 26 are also moved in a manner similar to that described in FIG. 1.

According to the invention, the mirror disposed substantially at an angle of 45° in front of the image plane is caused to make its reciprocating motion in parallel to a film surface, and the angle of the mirror can be maintained during motion. Therefore, an accurate static image may be maintained even when the mirror is in motion though there is produced a partial light image cut-off portion in a field of vision of a finder till said mirror is entirely withdrawn out of the image plane. A static image more accurate than a conventional one may be observed for a longer time than in the conventional case by the $t_1$ and $t_2$ as shown in FIG. 2 (1). In fact, during $t_1$ there is gradually produced a light image cut-off portion of the image as the mirror moves, and during $t_2$ there is gradually restored the clear image condition from the condition of having a light image cut-off portion as the mirror moves, so that viewing condition becomes prolonged by time of ($t_1$ +

$t_2)/2$ relative to the condition not producing an image cut-off portion. Even if the present device is operated at the same processing time as that of a conventional quick return device, the time available for viewing has been prolonged and therefore it can be said that the invention provides an improved device in the sense of a quick return device itself. This is found to be more effective when the number of frames taken for one second is desired to be increased in the case of continuous photographing. In case the shutter operating time and mirror operating time required to take one frame show is great, that is, in case the mirror remains stopped only for a short time in its normal position, the conventional device has less time available for observation and an image may move during the operation of the mirror to lose its function as a finder, while the device of the invention maintains its function as a finder.

According to the construction described and shown herein, it will be seen that the excursions of the mirror and shield plate terminate in the vicinity of dead points of the link motions thus effectively minimizing shock and vibration which would otherwise be caused by reciprocation of the mirror and shield plate.

Further, as a quick return device, movement of the rotating lever is changed into movement of the rocking lever to effect acceleration and reduction, thus providing a mechanism with very little shock. Moreover, according to the device shown in FIG. 3, the mirror and the shield plate are simultaneously moved in opposite directions from each other to offer better dynamic balance, and if mirror and shield plate are made to have the same mass, no vibration is produced in a direction of parallel motion. Further, even if the respective masses thereof are not the same, possible vibration produced thereby may be considerably reduced. The device of the invention is particularly advantageous when a large type of mirror is used.

I believe that the construction and operation of my novel quick return mirror device will be understood and that the advantages thereof will be fully appreciated by those persons skilled in the art.

I claim:

1. A movable mirror for use in a single lens reflex camera, comprising;
    a mirror movable in a direction parallel to a film surface and across the optical axis of the camera between a first position in the path of light rays passing through a photographic lens to view finder means and to prevent said light rays from reaching said film surface and a second position out of the path of said light rays whereby such rays reach said film surface;
    means for maintaining said mirror substantially at an angle of 45° to the optical axis of said camera;
    a shield plate movable between a first position entirely withdrawn from a view finder aperture and a second position in front of said view finder aperture;
    a driving shaft;
    a drive spring for rotating said driving shaft in one direction only by energy accumulated therein;
    a motor for accumulating energy in said driving spring;
    link means responsive to movement of said driving shaft for moving said mirror and said shield plate, the link means effecting a first link motion in which each of said mirror and said shield plate is moved from said first position to said second position during a half rotation of said driving shaft and a second motion in which each of said mirror and said shield plate is moved from said second position to said first position by a further half rotation of said driving shaft; and
    means for controlling said driving shaft, the control means functioning to stop said driving shaft when each of said mirror and said shield plate is in said first position, to release said driving shaft to effect said first motion of said link means under accumulated energy of said spring when the shutter of said camera is actuated, to stop said driving shaft so as to maintain said mirror and said shield plate in their respective second positions until completion of exposure of a predetermined time, and to release said driving shaft to effect said second motion of said link means after the completion of the exposure.

2. A movable mirror as defined in claim 1, wherein said mirror is integrally connected with said shield plate.

3. A movable mirror as defined in claim 1, wherein said link means comprises;
    first link means for moving said mirror in coordination with said driving shaft, said first link means making a first motion in which said mirror is moved from said first position to said second position by a half rotation of said driving shaft, and a second motion in which said mirror is moved from said second position to said first position by a further half rotation of said driving shaft, and
    second link means for moving said shield plate in coordination with said driving shaft, the second link means making a first motion in which said shield plate is moved from said first position to said second position by said half rotation of said driving shaft, and a second motion in which said shield plate is moved from said second position to said first position by said further half rotation of said driving shaft.

4. A movable mirror as defined in claim 3, wherein said first and second link means are simultaneously moved in parallel but opposite directions to improve dynamic balance.

* * * * *